US 8,558,487 B2

(12) United States Patent
Gabbie

(10) Patent No.: US 8,558,487 B2
(45) Date of Patent: Oct. 15, 2013

(54) REMOTE CONTROLLED CIRCUIT BREAKER FOR BATTERY POWERED RIDING TOYS

(76) Inventor: Steven W. Gabbie, Marianna, AR (US)

( * ) Notice: Subject to any disclaimer, the term of this patent is extended or adjusted under 35 U.S.C. 154(b) by 240 days.

(21) Appl. No.: 13/038,499

(22) Filed: Mar. 2, 2011

(65) Prior Publication Data

US 2011/0215742 A1     Sep. 8, 2011

Related U.S. Application Data

(60) Provisional application No. 61/309,536, filed on Mar. 2, 2010.

(51) Int. Cl.
*H02K 7/14*     (2006.01)

(52) U.S. Cl.
USPC ............. 318/17; 446/444; 446/461; 446/465; 280/3; 280/8; 280/12.13; 280/28.11; 280/29; 180/65.1; 180/65.51

(58) Field of Classification Search
USPC ...................... 307/96, 97, 100; 323/220, 265; 318/139, 17, 519; 180/65.1, 65.31, 180/65.51, 316; 310/67; 439/180; 446/465, 446/457, 454, 269; 340/3, 1, 3.22, 3.41, 340/3.42, 3.63, 4.34, 4.42
See application file for complete search history.

(56) References Cited

U.S. PATENT DOCUMENTS

| | | | | |
|---|---|---|---|---|
| 4,521,204 A * | 6/1985 | Wiggs et al. | ................... | 446/198 |
| 4,649,332 A * | 3/1987 | Bell | ................... | 320/117 |
| 5,401,924 A * | 3/1995 | Armanno, Sr. | ................ | 200/244 |
| 5,439,071 A | 8/1995 | Rodriguez-Ferre | | |
| 5,510,658 A | 4/1996 | Nakayama | | |
| 5,816,352 A * | 10/1998 | Hacker | ........................... | 180/167 |
| 5,816,358 A | 10/1998 | Adler et al. | | |
| 5,928,020 A * | 7/1999 | Bishop et al. | ................. | 439/188 |
| 6,113,459 A * | 9/2000 | Nammoto | ...................... | 446/454 |
| 7,033,209 B2 * | 4/2006 | Swiatek et al. | ............... | 439/502 |
| 7,344,430 B2 * | 3/2008 | Hasty et al. | ..................... | 446/456 |
| 7,438,148 B1 * | 10/2008 | Crea | ............................. | 180/167 |
| 7,938,218 B2 * | 5/2011 | Howell et al. | .................. | 180/197 |
| 8,366,135 B2 * | 2/2013 | Asbach et al. | ............. | 280/446.1 |
| 2010/0240276 A1 * | 9/2010 | Chu et al. | ...................... | 446/456 |
| 2011/0186364 A1 * | 8/2011 | Gugger | ............................ | 180/15 |

FOREIGN PATENT DOCUMENTS

IL     PCT/2004/000150     9/2004

OTHER PUBLICATIONS

Valdes-Dapena, Peter, Stop, thief! OnStar will brake stolen cars, CNNMoney.com, Oct. 9, 2007, http://money.cnn.com/2007/10/08/autos/gm_onstar_slowdown_tech/ (last visited Nov. 17, 2009).
Fong, Petti, Text your car to thwart thieves, Thestar.com, Apr. 17, 2009, http://www.thestar.com/article/619931 (last visited Nov. 17, 2009).

* cited by examiner

*Primary Examiner* — Rita Leykin
(74) *Attorney, Agent, or Firm* — Richard Blakely Glasgow

(57) ABSTRACT

A remote controlled circuit breaker for battery powered riding toys and method of using is disclosed. The circuit breaker is capable of being installed into standard electrical systems of battery powered riding toys via complementary connectors. If the child encounters danger while riding, the handler of the remote control can push the "Stop" button to switch the circuit breaker, thus preventing electric current flow through the toy. Once danger is averted, the handler of the remote control can push the "Go" button, which switches the circuit breaker to allow current flow from the battery to the motor, and thus allowing movement of the vehicle.

8 Claims, 4 Drawing Sheets

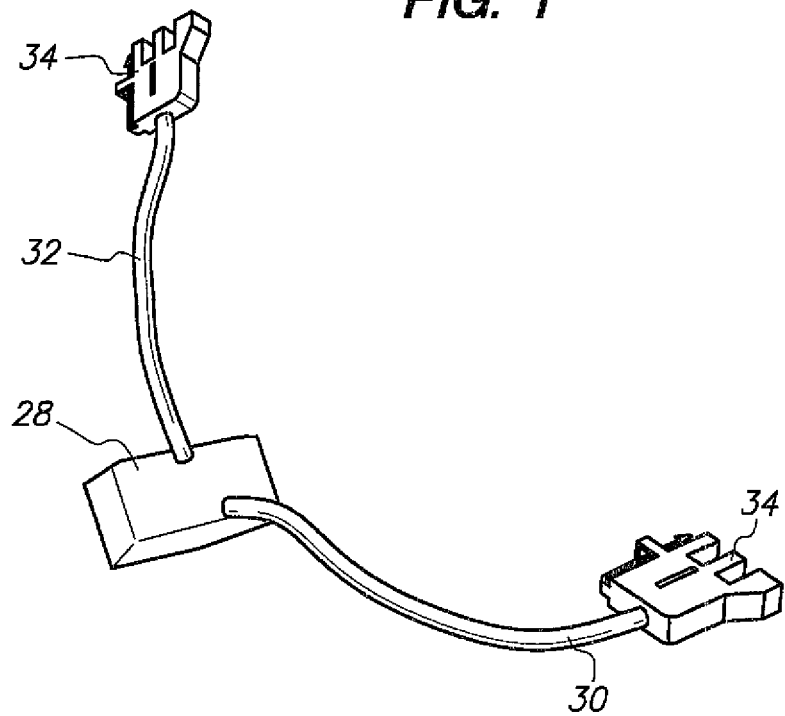
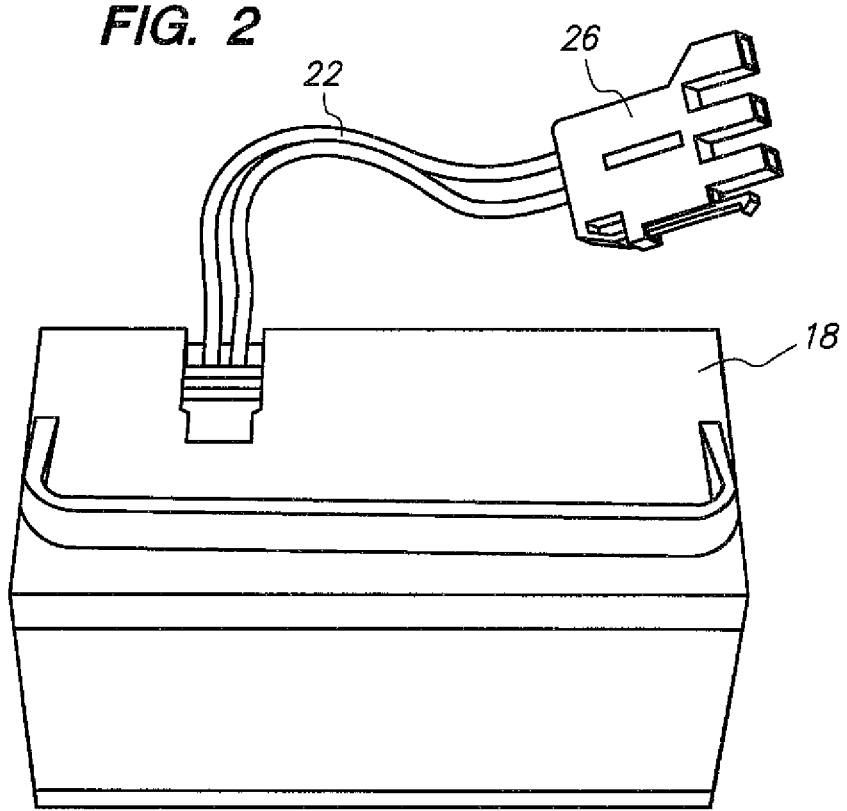

REMOTE CONTROLLED CIRCUIT BREAKER FOR BATTERY POWERED RIDING TOYS

CROSS-REFERENCE TO RELATED APPLICATIONS

This application claims the benefit of U.S. Provisional Application No. 61/309,536, entitled "Remote Controlled Circuit Breaker for Battery Powered Riding Toys" and filed Mar. 2, 2010. The complete disclosure of said provisional patent application is hereby incorporated by reference.

STATEMENT REGARDING FEDERALLY SPONSORED RESEARCH OR DEVELOPMENT

Not applicable

BACKGROUND OF THE INVENTION

1. Field of the Invention

The present invention relates to remote controlled circuit breakers, and in particular to remote controlled circuit breakers for battery powered riding toys.

2. Brief Description of the Related Art

One of the most popular brands of riding toys in the United States are Power Wheels®. The first Power Wheels® vehicles were released in 1971. In the forty years since, over 25 million vehicles have been sold. Another popular brand of battery powered riding toys is Peg-Perego®, which has been manufacturing riding toys since the 1960s. Its current line of battery powered riding toys includes battery powered John Deere and Polaris vehicles. Despite their popularity, riding toys come with substantial risk of injury to the riders. According to the U.S. Consumer Product Safety Commission, of the 69 toy related deaths reported involving children under the age of 15 in the years 2006-2008, riding toys were the number one cause.

During this same period, there was an estimated 229,600 toy related injuries. Likewise, riding toys were associated with more emergency room treated injuries than any other category of toy. Most were treated for head and facial injuries. Every year the cost of emergency room treatment for children with toy related injuries is more than $385 million.

Of the injuries and fatalities caused by riding toys, 75 percent were related to motorized vehicles, like Power Wheels® and Peg-Perego® vehicles. Riding toy injuries and deaths are caused primarily by falls and drowning. Reported deaths on riding toys range from children being struck by cars after riding into the street to drowning after riding into nearby ponds, lakes, or rivers. Thus, it is apparent that a contributing factor to the number of injuries is children riding in unsafe areas around stairs, traffic, and bodies of water. To prevent the risk of injuries, adults bear the burden of supervising children closely while playing on riding toys and keeping them within arms length.

To assist the supervising adult in controlling the riding toy, the prior art discloses remote controlled circuit breakers. U.S. Pat. No. 5,439,071 to Rodriguez-Ferre discloses a child's toy vehicle having a receiver circuit safety device which may be enabled by remote control. One drawback of the Rodriguez-Ferre patent is the need for the adult handling the remote control to continuously hold the button on the remote control. PCT Application No. PCT/2004/000150 of Gavish et al. solves this problem by disclosing a toy control unit that receives signal from a wireless remote control unit and can slow or stop the movement of the toy vehicle.

The prior art remote controlled circuit breakers do not provide for retrofitting standard electrical systems of the battery powered vehicles. Thus, adapting the standard electrical systems to use the prior art circuit breakers would be burdensome and require technical expertise. It is therefore desirable to develop a remote controlled circuit breaker that is capable of retrofitting standard models of battery powered riding vehicles by connecting to the existing electrical components via complementary connectors, thus requiring no technical expertise for installing. These limitations of the prior art are overcome by the present invention as described below.

BRIEF SUMMARY OF THE INVENTION

The first embodiment of the present invention is directed to a riding toy comprising (a) an electric motor; (b) a battery; (c) a battery relay with a first end and a second end, wherein said first end is attached to said battery and said second end comprises at least one connector; (d) a motor relay with a first end and a second end, wherein said first end is attached to said motor and said second end comprises at least one connector; (e) a circuit breaker with a first end and a second end; (f) a first circuit breaker relay with a first end and a second end, said first end of said first circuit breaker relay attached to said first end of said circuit breaker, said second end of said first circuit breaker relay comprising at least one complementary connector to said connector of said battery relay; and (g) a second circuit breaker relay with a first end and a second end, said first end of said second circuit breaker relay attached to said second end of said circuit breaker, said second end of said second circuit breaker relay comprising at least one complementary connector to said connector of said motor relay.

The second embodiment of the present invention is directed to an apparatus comprising (a) a circuit breaker with a first end and a second end; (b) a first circuit breaker relay with a first end and a second end, said first end of said first circuit breaker relay attached to said first end of said circuit breaker, said second end of said first circuit breaker relay comprising at least one complementary connector to a connector of a battery relay of a battery-powered riding toy; and (c) a second circuit breaker relay with a first end and a second end, said first end of said second circuit breaker relay attached to said second end of said circuit breaker, said second end of said second circuit breaker relay comprising at least one complementary connector to a connector of a motor relay of a battery-powered riding toy.

The third embodiment of the present invention is directed to a method comprising (a) connecting the second end of the first circuit breaker relay of the apparatus above to the battery relay of the battery-powered riding toy of the apparatus above; and (b) connecting the second end of the second circuit breaker relay of the apparatus above to the motor relay of the battery-powered riding toy of the apparatus above.

The fourth embodiment of the present invention is directed to a remote control comprising: (a) means for activating the circuit breaker of the above apparatus, and (b) means for deactivating said circuit breaker of the above apparatus.

The fifth embodiment of the present invention is directed to an apparatus comprising: (a) a circuit breaker with a first end and a second end; (b) a battery relay with a first end and second end, said first end of said battery relay capable of connecting to said first end of said circuit breaker, said second end of said battery relay capable of connecting to a battery; and (c) a motor relay with a first end and a second end, said first end of said motor relay capable of connecting to said second end of said circuit breaker, said second end of motor relay capable of connecting to a motor.

These and other features, objects and advantages of the present invention will become better understood from a consideration of the following detailed description of the preferred embodiment in conjunction with the drawings as described below.

BRIEF DESCRIPTION OF THE SEVERAL VIEWS OF THE DRAWINGS

FIG. 1 is a perspective view of the circuit breaker unit of the first preferred embodiment of the present invention.

FIG. 2 is a perspective view of the battery relay of the first preferred embodiment of the present invention.

DETAILED DESCRIPTION OF THE INVENTION

Figure 3:
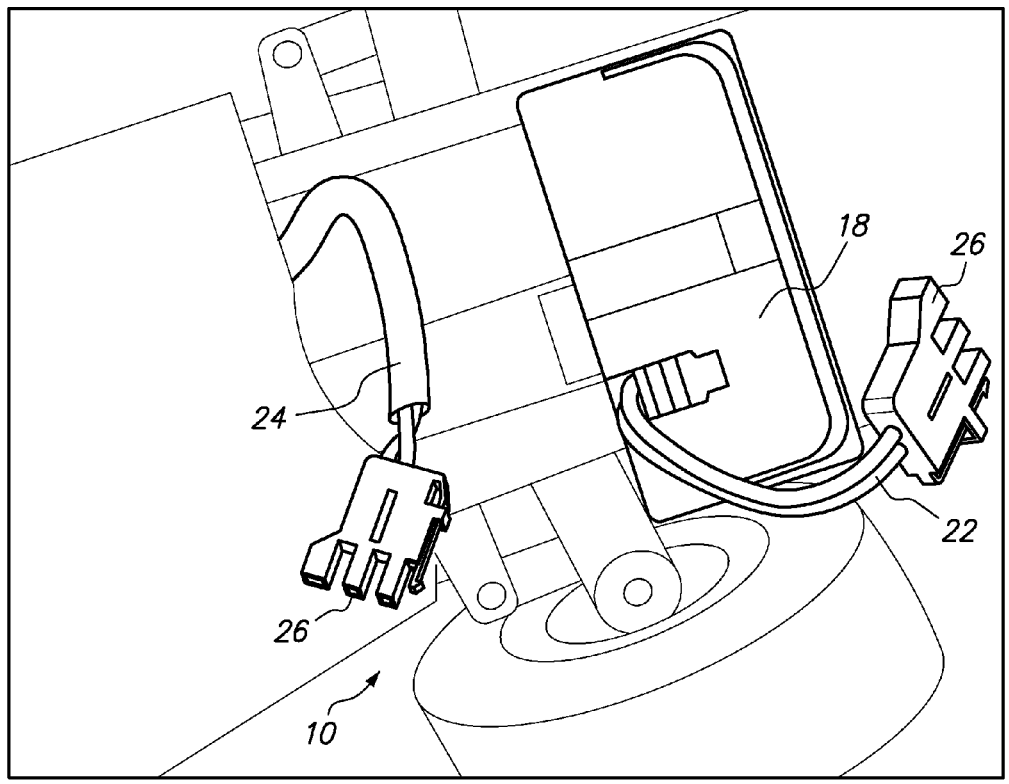
FIG. 3 is a perspective view of the motor relay and the battery relay of the first preferred embodiment of the present invention.
Figure 4:
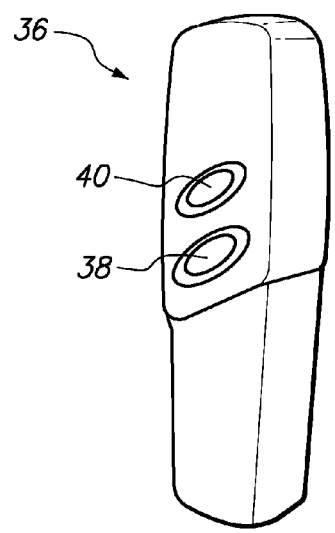
FIG. 4 is a perspective view of the remote control of the preferred embodiments of the present invention.
Figure 5:
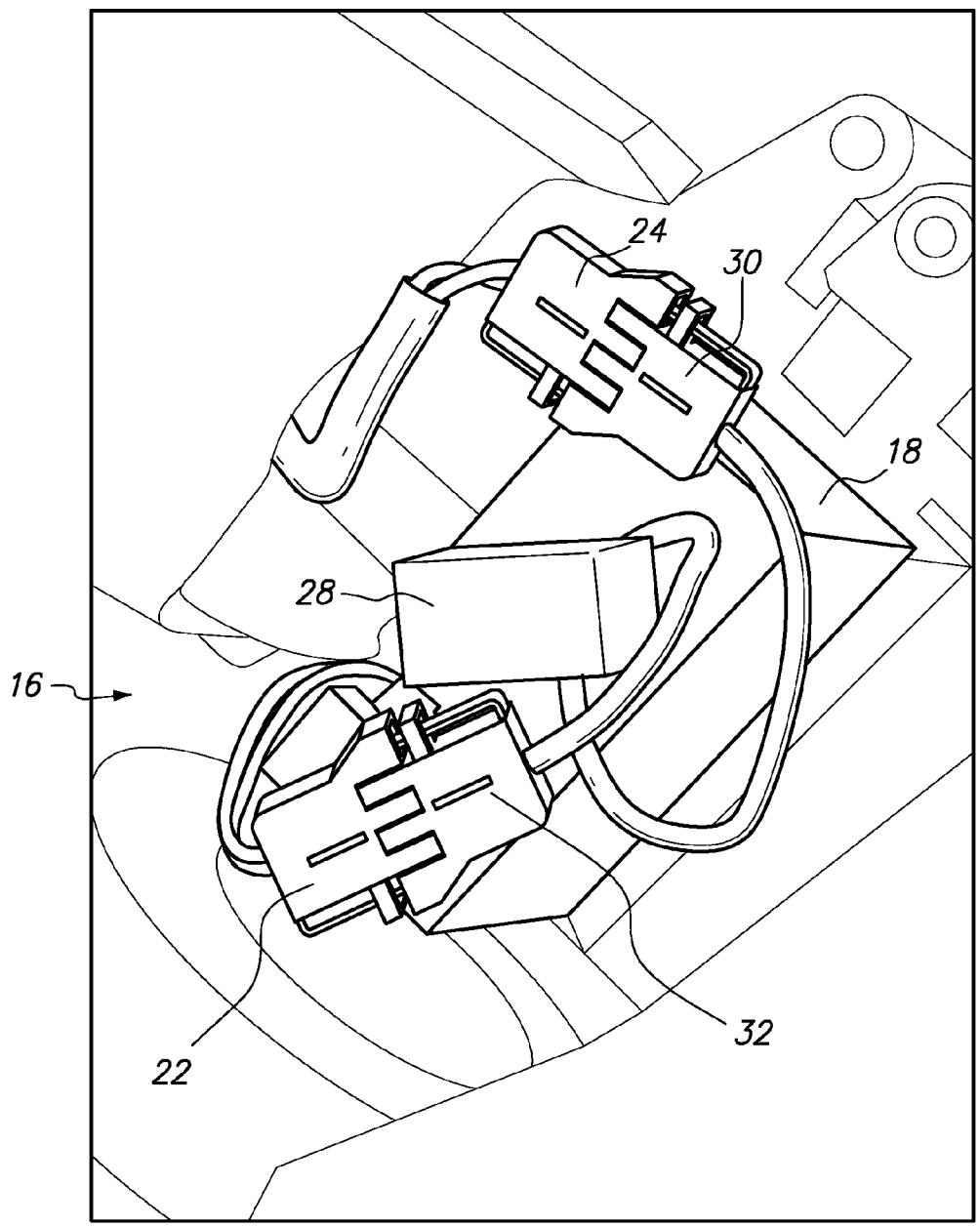
FIG. 5 is a perspective view of the connection between the circuit breaker unit and the battery relay and the motor relay of the first preferred embodiment of the present invention.
Figure 6:
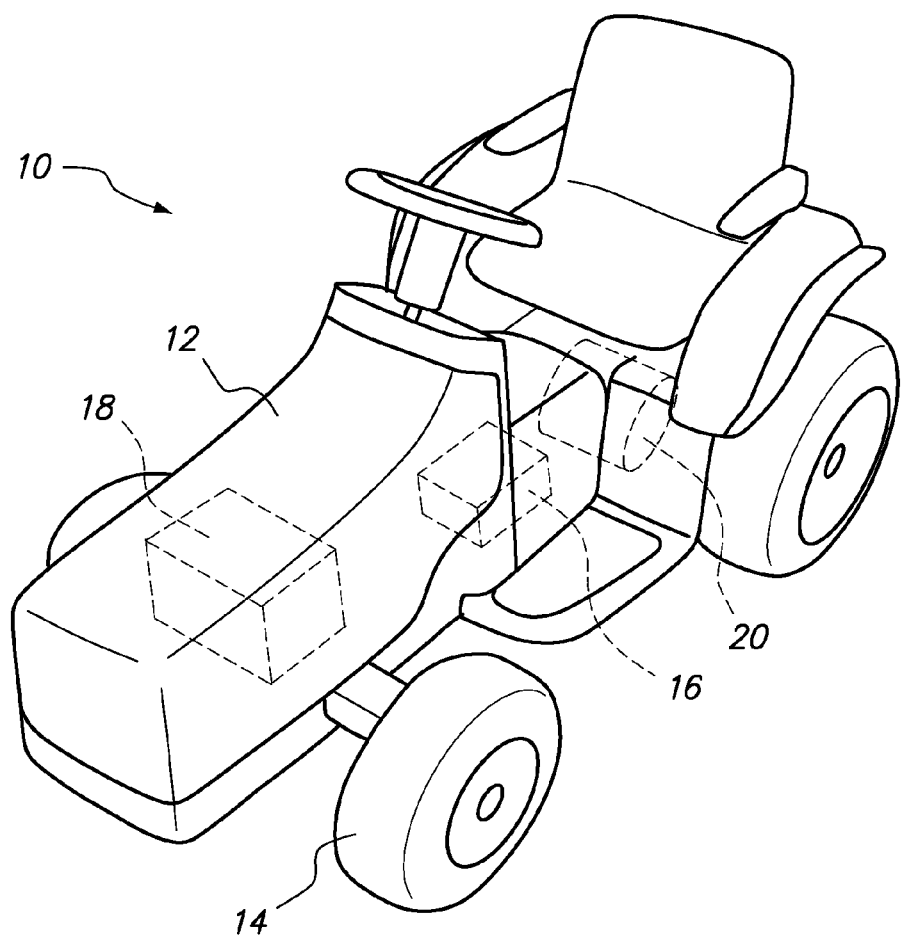
FIG. 6 is a perspective view of the riding toy of the preferred embodiments of the present invention.

With reference to FIGS. 1-7, the preferred embodiment of the present invention may now be described. A riding vehicle 10, such as a Power-Wheel® or Peg-Perego® vehicle, is comprised of a body 12, a mechanical system 14 (wheels, axels, etc.), and an electrical system 16. The electrical system 16 of battery powered riding vehicles is comprised of a 6V or 12V battery 18 and an electric motor 20. The battery 18 and electric motor 20 are connected via battery relay 22 and motor relay 24. Battery relay 22 and motor relay 24 are capable of being connected via complementary connectors 26 at the free end of each relay. When the battery relay 22 and motor relay 24 are connected, current from battery 18 travels through battery relay 22 and motor relay 24 to power the electric motor 20, thus enabling the vehicle 10 to move.

As shown in FIG. 3, the connectors 26 at the free ends of battery relay 22 and motor relay 24 are complementary to one another. For example, the male engaging members of battery relay 22 fit into the female recesses of motor relay 24, while the male engaging members of motor relay 24 fit into the female recesses of battery connector 22. Battery relay 22 and motor relay 24 can be disconnected when it is necessary to remove battery 18 from the vehicle, such as when the battery 18 needs to be recharged or replaced, by pulling the male engaging members from the female recesses. The complementary connectors 26 need not comprise male engaging members and female recesses, but instead can be complementary connectors of the type well-known to those skilled in the art.

As shown in FIG. 1, the circuit breaker unit 28 of the present invention is comprised of a circuit breaker and two connected relays 30, 32. The circuit breaker is not limited to a specific type of circuit breaker and may be practiced with any circuit breaker that can be remotely controlled which would be well known to those of ordinary skill in the art. The relays 30, 32 of circuit breaker unit 28 have complementary connectors 34 on their free ends. The complementary connectors 34 are complementary to the connectors on the free ends of the battery relay 22 and motor relay 24. Because of the complementary nature of the connectors, the circuit breaker unit 28 may be connected directly to the existing battery relay 22 and motor relay 24 of the vehicle 10. In other words, the connector on the free end of battery relay 22 can be connected to the free end of relay 30 of the circuit breaker unit 28. Likewise, the connector on the free end of motor relay 24 can be connected to the free end of relay 32 of the circuit breaker unit 28.

The circuit breaker unit 28 is controlled via remote control 36. Remote control 36 comprises a transmitter capable of sending radio signals that are received by a receiver in circuit breaker unit 28. The transmitter in remote control 36 is not limited to a specific type of transmitter and may be practiced with any transmitter that is capable of sending a radio signal which would be well known to those of ordinary skill in the art. Likewise, the receiver in circuit breaker unit 36 is not limited to a specific type of receiver and may be practiced with any receiver that can receive radio signals which would be well known to those of ordinary skill in the art.

Remote control 36 dictates the current flow through the electrical system 16. The user of the remote control 36 can switch the circuit breaker by pushing the "Stop" button 38. As a result, current cannot flow from the battery 18 to the motor 20 resulting in loss of power to the vehicle 10. For example, if the child rider of the vehicle 10 traveled outside of the restricted play area or a dangerous obstacle was encountered, the user of the remote control could push the "Stop" button 38, thus stopping the vehicle 10 immediately. Once the vehicle 10 is located back in the play area or danger has been averted, the user of the remote control can switch the circuit breaker 28 by pushing the "Go" button 40. By pushing the "Go" button 40, current is allowed to flow from the battery 18 to the motor 20. As a result, the power to the vehicle 10 is restored.

Figure 7:
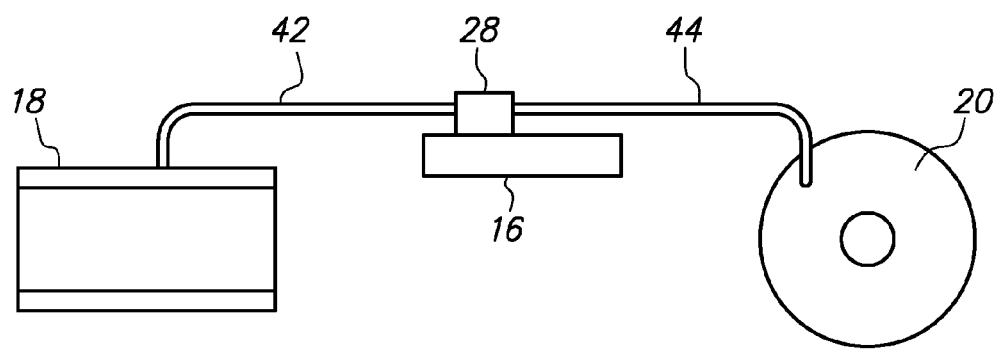
FIG. 7 is a plan view of the connection of the electric motor and the battery through the circuit breaker unit of the second preferred embodiment of the present invention.

In an alternative embodiment, instead of attaching to the existing electrical system 16 of a vehicle 10, the electrical system 16 is replaced with (or manufactured with) a circuit breaker unit 28. In this embodiment, as shown in FIG. 7, a circuit breaker relay 42 is attached to the circuit breaker unit 28 at its first end, wherein the battery relay 42 is attached to the battery 18 of the vehicle 10. Likewise, a motor relay 44 is attached to the circuit breaker unit 28 at its second end, wherein the motor relay 44 is attached to the motor 20 of the vehicle 10.

The present invention has been described with certain preferred and alternative embodiments that are intended to be exemplary only and not limiting to the full scope of the invention.

What is claimed is:

1. A toy comprising:
   a. an electric motor;
   b. a battery;
   c. a battery relay with a first end and a second end, wherein said first end is attached to said battery and said second end comprises at least one connector;
   d. a motor relay with a first end and a second end, wherein said first end is attached to said motor and said second end comprises at least one connector;
   e. a circuit breaker device having a casing and a first exterior end and a second exterior end;
   f. a first circuit breaker relay with a first end and a second end, said first end of said first circuit breaker relay attached to said first exterior end of said circuit breaker device, said second end of said first circuit breaker relay comprising at least one complementary connector to said connector of said battery relay; and g. a second circuit breaker relay with a first end and a second end, said first end of said second circuit breaker relay attached to said exterior second end of said circuit breaker device, said second end of said second circuit breaker relay comprising at least one complementary connector to said connector of said motor relay.

2. The riding toy of claim 1 wherein said battery is six volts.

3. The riding toy of claim 1 wherein said battery is twelve volts.

4. The riding toy of claim 1 wherein said circuit breaker is remote controllable.

5. An apparatus comprising:
   a. a circuit breaker device having a casing and a first exterior end and a second exterior end;
   b. a first circuit breaker relay with a first end and a second end, said first end of said first circuit breaker relay attached to said first exterior end of said circuit breaker device, said second end of said first circuit breaker relay comprising at least one complementary connector to a connector of a battery relay of a battery-powered riding toy; and
   c. a second circuit breaker relay with a first end and a second end, said first end of said second circuit breaker relay attached to said second exterior end of said circuit breaker device, said second end of said second circuit breaker relay comprising at least one complementary connector to a connector of a motor relay of a said battery-powered riding toy.

6. The apparatus of claim 5 wherein said circuit breaker is remote controllable.

7. A method of retrofitting a battery-powered riding toy with a circuit breaker device, wherein said riding toy comprises an electric motor, a battery, a battery relay having a first end connected to said battery, a motor relay having a first end connected to said motor, wherein a second end of said battery relay is connected to a second end of said motor relay, the method comprising the steps of:
   a. disconnecting said second end of said battery relay from said second end of said motor relay;
   b. connecting a second end of a first circuit breaker relay to said second end of said battery relay of said battery-powered riding toy, wherein a first end of said first circuit breaker relay is connected to a circuit breaker device; and
   c. connecting a second end of a second circuit breaker relay to said second end of said motor relay of said battery-powered riding toy, wherein a first end of said second circuit breaker relay is connected to said circuit breaker device.

8. A method of installing a circuit breaker device into battery-powered riding toy, wherein said riding toy comprises an electric motor, a battery, a battery relay having a first end connected to said battery, and a motor relay having a first end connected to said motor, the method comprising the steps of:
   a. connecting a second end of a first circuit breaker relay to a second end of said battery relay via complementary connectors, wherein a first end of said first circuit breaker relay is connected to a circuit breaker device; and
   b. connecting a second end of a second circuit breaker relay to a second end of said motor relay via complementary connectors, wherein a first end of said second circuit breaker relay is connected to said circuit breaker device.

* * * * *